(No Model.) 2 Sheets—Sheet 2.
E. R. DRAVER.
CONVEYER.
No. 544,031. Patented Aug. 6, 1895.
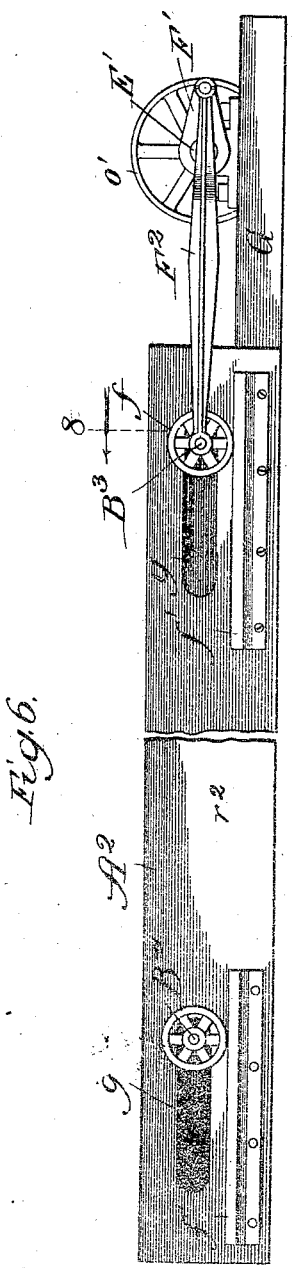
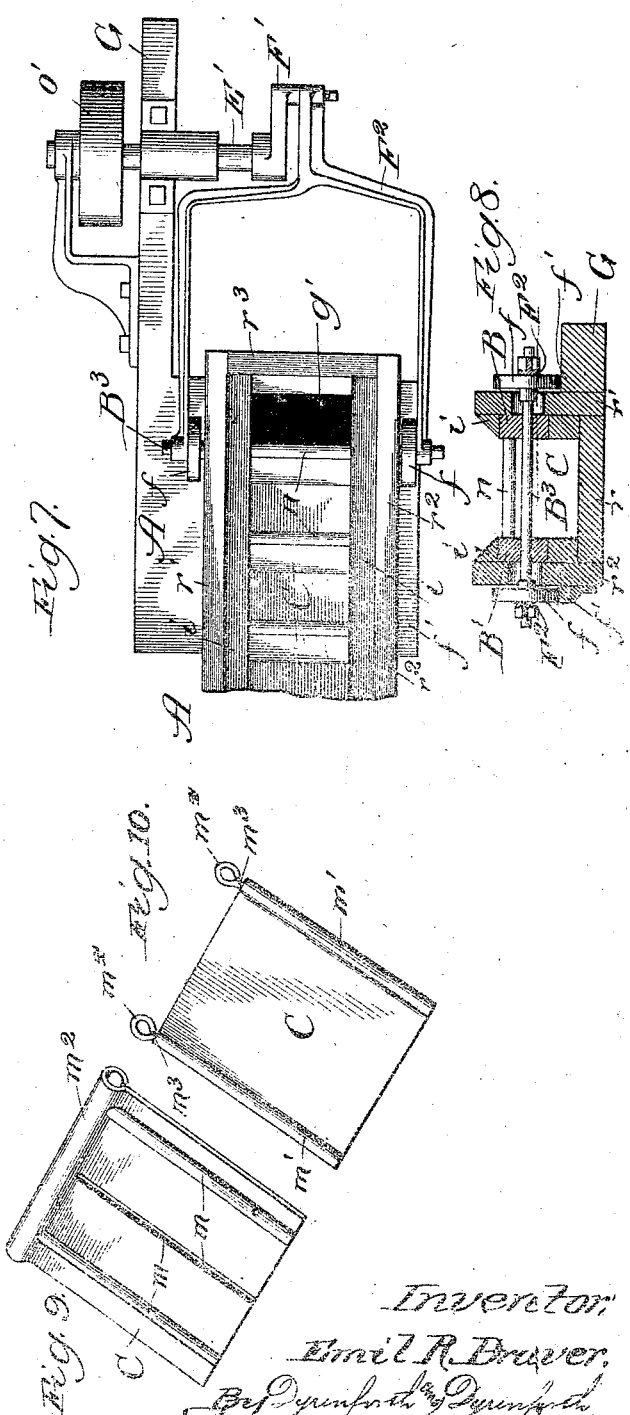
Witnesses:
Inventor:
Emil R. Draver,

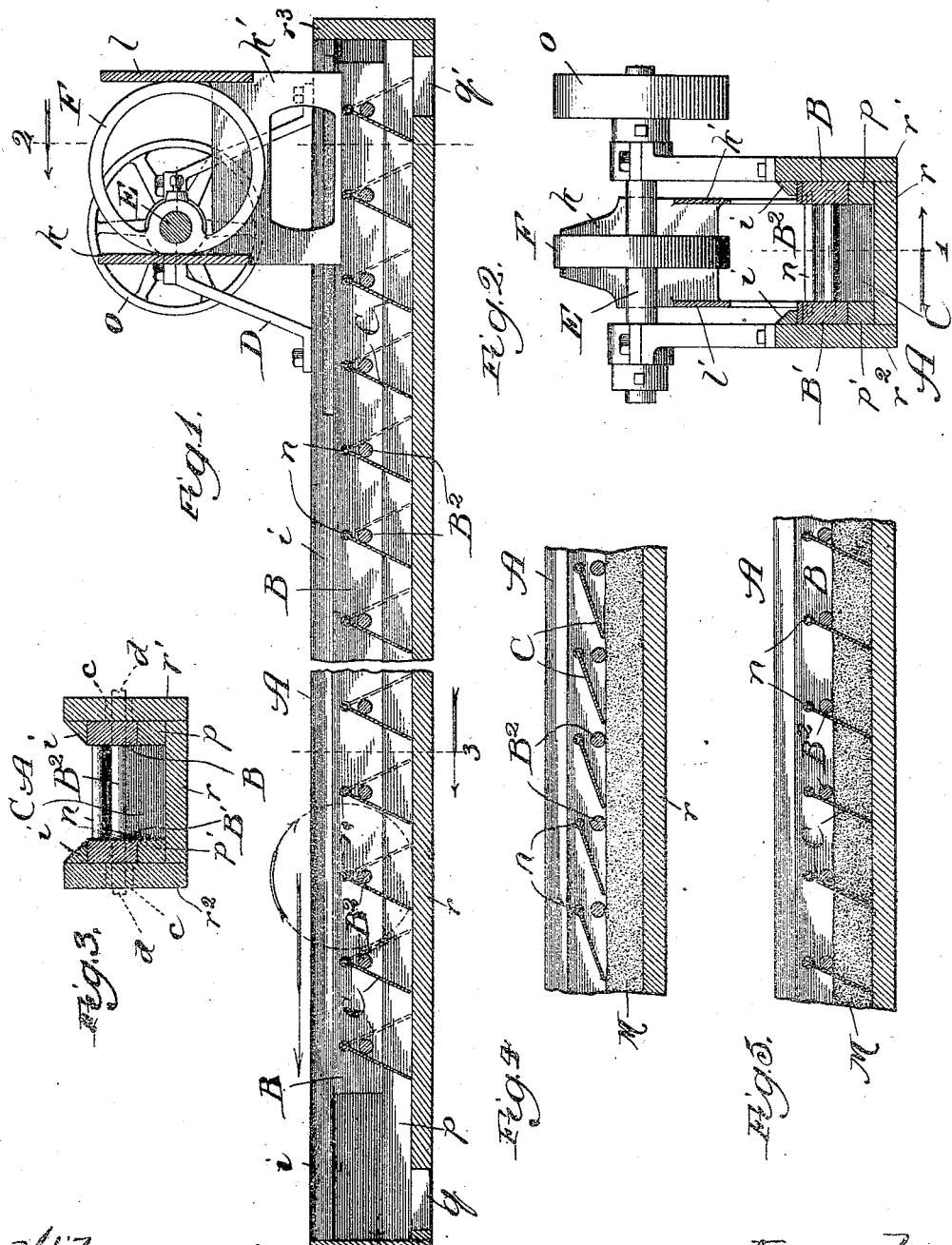

UNITED STATES PATENT OFFICE.

EMIL R. DRAVER, OF ALLIANCE, NEBRASKA, ASSIGNOR TO FLORENCE N. DRAVER, OF SAME PLACE.

CONVEYER.

SPECIFICATION forming part of Letters Patent No. 544,031, dated August 6, 1895.

Application filed April 8, 1895. Serial No. 544,289. (No model.)

*To all whom it may concern:*

Be it known that I, EMIL R. DRAVER, a citizen of the United States, residing at Alliance, in the county of Boxbutte and State of Nebraska, have invented a new and useful Improvement in Conveyers, of which the following is a specification.

My present invention is primarily designed as an improvement on the construction of conveyer set forth in Letters Patent of the United States, No. 538,822, granted to me May 7, 1895; and my object is to improve my aforesaid former construction in matters of detail, as hereinafter set forth.

Referring to the accompanying drawings, Figure 1 is a broken view in longitudinal sectional elevation of a conveyer constructed in accordance with my improvement, the section being taken at the line 1 on Fig. 2 and viewed in the direction of the arrow; Fig. 2, a section taken at the line 2 on Fig. 1 and viewed in the direction of the arrow; Fig. 3, a section taken at the line 3 on Fig. 1, viewed in the direction of the arrow and showing by dotted lines a modification. Figs. 4 and 5 are similar broken longitudinal sections of my improved conveyer, diagrammatic in their nature, to illustrate the action of the pivotal shovel-gates in their back-and-forth motions on the material being conveyed. Fig. 6 is a view like that presented by Fig. 1, but showing a modification; Fig. 7, a broken plan view of the construction represented in Fig. 6; Fig. 8, a section taken at the line 8 on Fig. 6 and viewed in the direction of the arrow; and Figs. 9 and 10 are perspective views of different constructions of the shovel-gate suitable for my purpose.

A is a rectangular box of any desired length and shown as formed with a bottom $r$, which should be provided with discharge-openings $q$ and $q'$ near its opposite ends, sides $r'$ and $r^2$, and closed ends $r^3$ and $r^4$. In the conveyer-box A, on the bottom, against the opposite sides $r'$ and $r^2$, are stationary rails $p$ and $p'$ extending throughout the length of the box and affording ways for side bars B and B', imposed upon them to be reciprocated longitudinally thereon, the length of the side bars being less than that of the box to afford them play therein. As shown in Figs. 1 to 5, inclusive, these side bars are connected at suitable and preferably equal intervals by tie-rods $B^2$, which I prefer to form of wood and in cylindrical shape and which may enter at their ends sockets in the side bars, as indicated in Fig. 2, and are fastened in place, as by gluing, to afford a strong and rigid frame, in which the shovel-gates are suspended, as hereinafter described.

Directly above each tie-rod there extends between the side bars a pivot-rod $n$ for a shovel-gate C, the width of which should be such as to cause it to reach from side to side of the box between the rails $p$ $p'$ and the side bars upon them, which latter thus afford a form of shovel-gate supports. I prefer to form the shovel-gates of sheet metal and to strengthen them by means of corrugations $m$, as shown in Fig. 9, or by means of edge beads $m'$, as shown in Fig. 10, containing wire rods $m^3$, provided with eyes $m^4$ at which to suspend the shovel-gate on its pivot-rod, and the upper edge of each shovel-gate of the corrugated form is bent into the form of a tube $m^2$, at which to encircle the pivot-rod $n$ from which it is suspended. Thus, as will be seen, the pivotally-supported shovel-gates are reversible by turning them over on their pivots to extend in the position in which they are represented by full lines, or in that in which they are represented by dotted lines, and the tie-rods $B^2$ are located preferably in vertical line directly beneath the pivots and afford lower bearings for the shovel-gates, against which they are reversible, whereby they extend, in either position, at the same angle of inclination with relation to the conveyer bottom, all according to the principle involved in my aforesaid former construction. In this connection it may be suggested that my invention contemplates provision for reversing the shovel-gates instead of turning them over, as described, by turning them while remaining in their suspended position from one side of their stops to the other. To enable this to be done the stops must extend, at their ends, through longitudinal slots in the sides of the box A, and the stops must be withdrawable lengthwise from the box to remove them from the path of the shovel-gates in so turning the latter. I have indicated this modified construction in Fig. 3, wherein c denotes the longitudinal slots in the sides of the conveyer-box and d the extended ends of the stop-affording tie-rods passing through the slots.

For reciprocating the side-bars B and B' I show, in Figs. 1 and 2, a frame D, rigidly fastened on the conveyer-box near one end thereof, and having journaled in it a rotary drive-shaft E, carrying at one end a belt-pulley o and between its ends an eccentric F, confined between upright plates l and k, extending, respectively, between the opposite ends of a pair of side plates l' and k', fastened at their lower edges to the side-bars B and B', whereby the latter are reciprocated, and with them the shovel-gates and tie-bars, by rotating the shaft E. Any other suitable form of driving means may, however, be employed for the same purpose without departure from my invention.

The construction of my improved conveyer thus described adapts it particularly for conveying soft material—such as flour, meal, and similar products—which, when introduced into the box A, and the shaft E being set in motion to reciprocate the side bars, is conveyed toward and discharged at either opening q or q', depending on which side of the tie-rods the shovel-gates are adjusted to bear the motion of the side bars in one direction, causing the shovel-gates to slide over the material and their motion in the opposite direction engaging the shovel-gates, owing to the stops B² behind them, with the material, causing them to dig into the latter and, by the advance of the side bars, convey it to the respective discharge-openings.

To prevent any of the material being conveyed from getting between the side bars and sides r' and r² of the conveyer-box, I shield the space between them (not shown because of the small scale of representation observed in the drawings) with covering-strips i i, extending over the side bars from the sides of the box, and which may be wooden strips of V shape, or approximately that shape in cross-section, or strips of leather, cloth, or the like.

Advantages of having the tie-bars, forming back stops for the pivotal shovel-gates, extending across the conveyer-box from one side thereof to the other are due to their affording free or unobstructed space above the shovel-gates in which to reverse them and means for leveling the material when the conveyer is working at its full capacity, as indicated in Figs. 4 and 5, wherein the material to be conveyed is indicated at M. As the shovel-gates are represented in Fig. 4, the side bars are moving in the direction to lift and slide the shovel-gates over the material, and as they are represented in Fig. 5 the side bars are moving in the opposite direction, where the shovel-gates dig into the material up to the stops or tie-bars, after which the material is shoveled along by the gates.

When the conveyer is employed for conveying gritty material—such as sand, cement, or the like—I prefer to construct it as shown in Figs. 6, 7, and 8, wherein the side bars B and B', also connected at intervals by the tie-rods B², each directly underneath a pivot-rod n, carrying a shovel-gate C, have the end tie-rods extended at their opposite extremities, as shafts B³ and B⁴, through longitudinal slots g in the sides of the conveyer-box, outside of which they carry wheels f running on tracks f' below the slots g, the length of which is sufficient to allow the required play of the reciprocating side bars in the box. Each shaft B³ B⁴, is like each tie-rod B², by preference directly underneath a pivot-rod n and affords a stop for the reversible shovel-gate thereon, and the shafts thus carry the shovel-gate supports.

As the means for reciprocating the side bars carrying the shovel-gates in the modified construction thus described, I show a rotary crank-shaft E', carrying a belt-pulley o' and journaled in bearings provided on an extension G at one side of an end of the conveyer-box, the crank F' engaging a yoke F², having its arms flanking the box and pivotally connected with the opposite ends of the adjacent shaft B³.

What I claim as new, and desire to secure by Letters Patent, is—

1. In a conveyer, the combination with the box, of side-bars reciprocably supported therein, shovel-gates pivotally and reversibly supported between said side-bars at suitable intervals apart to engage at their lower free ends the material, tie-bars connecting the side-bars at intervals and affording stops against which said shovel-gates are reversible, and driving means for imparting the reciprocating motion to the side-bars, substantially as described.

2. In a conveyer, the combination with the box, of side-bars reciprocably supported therein along the sides of the box, covering-strips extending from said sides over the side-bars, shovel-gates pivotally and reversibly supported between said side-bars at suitable intervals apart to engage at their lower free ends the material, tie-bars connecting the side-bars at intervals and located directly beneath the shovel-gate pivots and affording stops against which said shovel-gates are reversible, and driving means for imparting the reciprocating motion to the side-bars, substantially as described.

3. In a conveyer, the combination with the box having longitudinal slots g in its sides, of reciprocable shovel-gate supports in the box, shovel-gates pivoted reversibly on said supports, and stops thereon for the shovel-gates, located directly beneath the shovel-gate pivots, shafts passing at their opposite ends through said slots and carrying said shovel-gate supports, and bearings for the projecting ends of said shafts at the outer sides of the box, substantially as described.

4. In a conveyer, the combination with the box having longitudinal slots $g$ in its sides, of side-bars B and B' reciprocably supported therein, shovel-gates C pivotally and reversibly supported between said side-bars at suitable intervals apart to engage at their lower free ends the material, tie-bars $B^2$ connecting the side-bars at intervals and located directly beneath the shovel-gate pivots and affording stops against which said shovel-gates are reversible, shafts $B^3$ and $B^4$ extending at their opposite ends beyond the side-bars through said slots $g$ and carrying wheels $f$, tracks $f'$ for said wheels, and driving means for imparting the reciprocating motion to the side-bars, substantially as described.

EMIL R. DRAVER.

In presence of—
 H. C. DRAVER,
 E. W. DRAVER.